(12) United States Patent
Kirk

(10) Patent No.: US 10,959,561 B2
(45) Date of Patent: Mar. 30, 2021

(54) COFFEE FILTER SUPPORT DEVICE AND METHOD

(71) Applicant: Catherine Delyn Kirk, Grand Junction, CO (US)

(72) Inventor: Catherine Delyn Kirk, Grand Junction, CO (US)

( * ) Notice: Subject to any disclaimer, the term of this patent is extended or adjusted under 35 U.S.C. 154(b) by 13 days.

(21) Appl. No.: 16/153,442

(22) Filed: Oct. 5, 2018

(65) Prior Publication Data

US 2020/0107668 A1    Apr. 9, 2020

(51) Int. Cl.
*A47J 31/06* (2006.01)
*A47J 31/44* (2006.01)
*A23F 5/26* (2006.01)

(52) U.S. Cl.
CPC .......... *A47J 31/06* (2013.01); *A23F 5/26* (2013.01); *A47J 31/446* (2013.01); *A47J 31/4471* (2013.01)

(58) Field of Classification Search
CPC ...... A47J 31/06; A47J 31/446; A47J 31/4464; A47J 31/4471
See application file for complete search history.

(56) References Cited

U.S. PATENT DOCUMENTS

| | | | |
|---|---|---|---|
| 4,656,932 A | 4/1987 | Kopp | |
| 4,728,425 A | 3/1988 | Sandvig | |
| 4,735,719 A * | 4/1988 | Benedict | A47J 31/06 210/474 |
| 4,765,896 A | 8/1988 | Hartley et al. | |
| 4,865,737 A | 9/1989 | McMichael | |
| 4,885,987 A | 12/1989 | Franke et al. | |
| 4,963,262 A | 10/1990 | Johnstone | |
| 5,064,533 A | 11/1991 | Anson | |
| 5,176,830 A | 1/1993 | Wiggins | |
| 5,178,058 A * | 1/1993 | van Dort | A47J 31/057 99/295 |
| 5,507,948 A | 4/1996 | Wargo | |
| 5,536,393 A * | 7/1996 | Weeks | A47J 31/446 210/232 |
| 5,888,392 A * | 3/1999 | Frizell | A47J 31/06 210/238 |
| 9,867,494 B2 | 1/2018 | Frazer | |
| 2012/0321748 A1* | 12/2012 | Otto | A47J 31/06 426/80 |
| 2013/0068108 A1* | 3/2013 | Rivera | A47J 31/0647 99/287 |

* cited by examiner

*Primary Examiner* — Ryan A Reis

(57) ABSTRACT

Embodiments provided herein address these and other issues by providing a coffee filter support device that, when positioned placed at least partly in a coffee basket, provides a contact surface that prevents the coffee filter from collapsing inward during the brewing process. In one embodiment, the coffee filter support device has a frustoconical shape defined by a first aperture and a second aperture smaller than the first aperture.

18 Claims, 5 Drawing Sheets

COFFEE FILTER SUPPORT DEVICE AND METHOD

BACKGROUND

The process of brewing coffee with a bendable coffee filter (e.g., a paper filter) in a coffee brewing machine is often susceptible to problems related to the coffee filter collapsing or folding in on itself during brewing (particularly once the filter becomes wet and less structurally sound). This can result in a filtering failure, potentially allowing coffee grounds to get into the brewed coffee.

SUMMARY

Embodiments provided herein address these and other issues by providing a coffee filter support device that, when positioned placed at least partly in a coffee basket, provides a contact surface prevents the coffee filter from collapsing inward during the brewing process. In one embodiment, the coffee filter support device has a frustoconical shape defined by a first aperture and a second aperture smaller than the first aperture.

In some embodiments, the coffee filter support device may be inserted into a coffee basket of a coffee brewing machine such that the sloping body of the support device will contact at least a portion of a coffee filter placed within the coffee basket.

In an alternative embodiment, the support device may be affixed to the coffee basket of the coffee brewing machine. The coffee brewing machine may come with the support device appropriately positioned so that when the coffee filter support device is inserted into the coffee basket of the coffee brewing machine the sloping body of the support device will contact at least a portion of the coffee filter. The coffee filter support device may be affixed to the coffee basket by a hinge or other attachment means.

DETAILED DESCRIPTION

For purposes of promoting an understanding of the present disclosure, reference will be made to the following embodiments and specific language will be used to describe the same. It will nevertheless be understood that no limitation of the scope of the disclosure is thereby intended, such alterations and further modifications in the described subject matter, and such further applications of the disclosed principles as described herein being contemplated as would normally occur to one skilled in the art to which the disclosure relates.

It can be noted that, although embodiments provided herein are directed toward a coffee filter support, alternative embodiments are not so limited. Alternative embodiments may, for example, be utilized in other similar filtering applications (e.g., tea and/or other brewed drinks) in which filters are used.

Disclosed embodiments pertain generally to addressing problems associated with a coffee filter collapsing or folding in on itself and not keeping the coffee grounds contained. By way of example, coffee filters are often made out of paper and can collapse or fold, particularly when wet, spilling coffee grounds.

Figure 1:
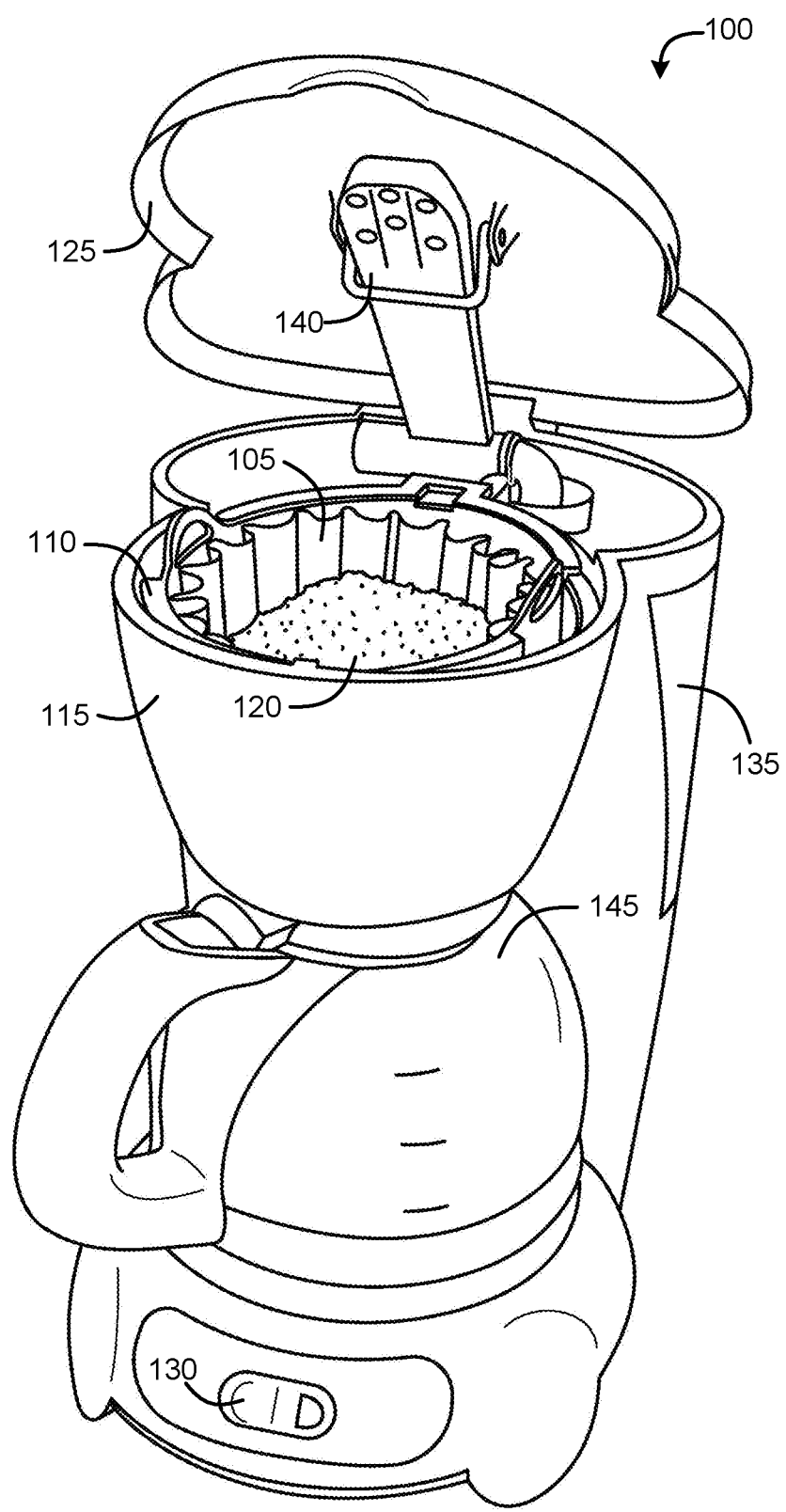
FIG. 1 is an illustration of example coffee brewing machine.

FIG. 1 is an illustration of an example coffee brewing machine 100 provided to help illustrate at least some issues that may be addressed by embodiments herein. A user of the coffee brewing machine 100 may brew coffee by placing a coffee filter 105 into a coffee filter basket 110 positioned within a brewing chamber 115 of the coffee brewing machine 100, and placing coffee grounds 120 into the coffee filter 105. The user then closes the lid 125 and presses a brewing switch 130. This causes the coffee brewing machine 100 to begin brewing coffee by heating water drawn from a water reservoir 135, and dripping the water from a shower head 140 over the coffee grounds 120. The resulting brewed coffee then filters through the coffee filter 105, dripping from the brewing chamber 115 into the decanter 145. (It can be noted, however, coffee brewing machines 100 may vary significantly in form and functionality, differing, for example, in types of decanters or carafes, sources of water, showerhead types, etc. The embodiments of a coffee filter support device and/or the techniques for using the coffee filter support device provided herein can be utilized in any of a variety of coffee brewing machines 100.)

As previously noted, however, the brewing process can compromise the structural integrity of the coffee filter 105. More specifically, the coffee filter 105 (typically a disposable paper filter) may absorb some water and collapse or fold inward on itself. Water may then sweep some of the coffee grounds around the coffee filter 105 and into the decanter 145. Contaminated with coffee grounds, the coffee in the decanter 145 is typically considered undrinkable and must be either re-filtered or thrown out.

Figure 2:
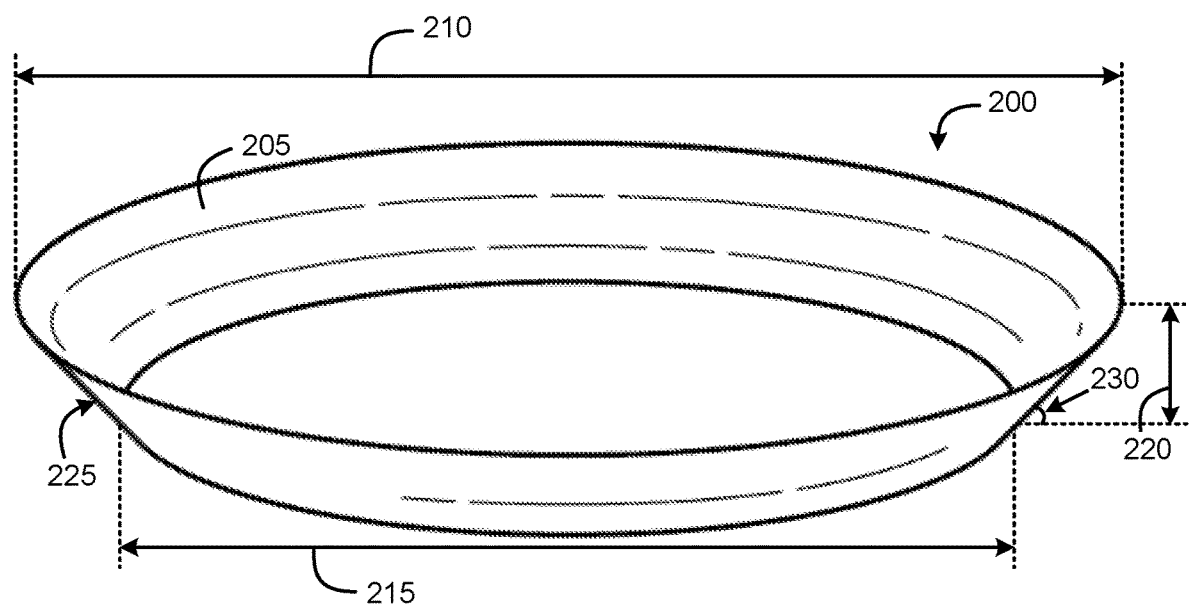
FIG. 2 is a perspective view illustrating an embodiment of the coffee filter support device.

FIG. 2 is a perspective view of a coffee filter support device 200, according to an embodiment, that can be utilized to help prevent collapse of the coffee filter 105. Here, the coffee filter support device 200 comprises a sloping body 205 having a frustoconical shape defining a first aperture having a first diameter 210 and a second aperture having a second diameter 215 smaller than the first diameter 210. The height 220 of the sloping body 205 may be defined as a distance between the first aperture and the second aperture.

As explained in more detail below, the coffee filter support device 200 may be used by placing the coffee filter support device 200 on a coffee filter 105 in a coffee filter basket 110 such that a contact surface 225 of the sloping body 205 comes in contact with the coffee filter 105 (e.g., at the rim of the coffee filter 105) and/or coffee filter basket 110. This can help prevent the coffee filter 105 from collapsing inward during the brewing process.

Dimensions of the coffee filter support device 200 may vary, depending on desired functionality. Different embodiments may be used, for example, in different types of coffee brewing machines 100. Larger coffee filter support devices 200 may be used with coffee brewing machines 100 having larger coffee filter baskets 110 and/or using larger coffee filters 105. As such, embodiments of the coffee filter support device 200 may be used not only in residential/consumer coffee brewing machines, but also in machines used for restaurant/commercial applications.

In some embodiments, the diameter 210 of the first aperture may be less than a diameter of a coffee filter basket 110 into which the coffee filter support device 200 may be placed. This may help ensure the coffee filter support device 200 may be located wholly within the coffee filter basket 110 into which it is placed, which may be advantageous to help ensure closure of the lid 125 of the coffee brewing machine 100.

In some embodiments, for example, the diameter 210 of the first aperture is greater than four inches and the diameter 215 of the second aperture is less than four inches. In some embodiments, the height 220 of the sloping body may be between ½ inch and ¾ inch. Additionally or alternatively, the angle 230 between the sloping body and a surface parallel to the second aperture may be less than 70°, such as between 50° and 70° (e.g., 60°). More generally, the diameters 210, 215, height 220, and/or angle 230 of different embodiments may differ to accommodate the dimensions of coffee filter baskets, showerheads, and/or other related components of various coffee brewing machine types.

Here, the angle 230 can impact the overall functionality of the coffee filter support device 200. For example, ensuring a relatively shallow angle (e.g., less than 70°) can facilitate ease of use, making it easy to place the coffee filter support device 200 on the coffee filter 105 and within the coffee filter basket 110 in such a way that is properly positioned at least partially within the coffee filter basket 110. Traditional filter support devices with relatively steeper angles require more precise placement and more specific tailoring to a particular type of coffee brewing machine 100. Difficulties in the placement of traditional filter support devices can be compounded in instances when the rim of a coffee filter 105, when placed into the coffee filter basket 110, fails to create a generally circular shape that would accommodate a generally larger aperture of traditional filter support devices. (E.g., creating, from an overhead perspective, a "D"-shape rather than an "O"-shape, due to inward bending on one side.) In contrast, embodiments of the coffee filter support device 200, may be more capable of accommodating different types/sizes of coffee filter baskets and instances in which the rim of the coffee filter 105 forms a noncircular shape, due at least in part to the relatively shallow angle 230 and resulting smaller aperture (e.g., second diameter 215).

Additionally, with relatively shallow angle 230, embodiments of the coffee filter support device 200 can have a much simpler profile than traditional filter support devices. Because traditional filter support devices have steeper angles, they require other features (e.g., a separate flanged rim or tab) to prevent the filter device from falling into the coffee filter 105 by "catching" the rim of the coffee filter 105 or coffee filter basket 110. This can complicate both manufacturing and use of a filter support devices. In contrast, as shown in FIG. 2, embodiments of the coffee filter support device 200 disclosed herein may have a relatively simple profile, where the contact surface 224 of the sloping body 205 forms a simple linear connection between the first and second aperture. (That said, alternative embodiments may have alternatively-shaped profiles, such as convex or concave curvature, depending on desired functionality.) As such, the coffee filter support device 200 can be simpler to manufacture and use than traditional filter support devices.

The sloping body 205 itself may comprise one or more food-grade materials, such as plastic and/or metal. Embodiments may utilize materials that are heat-resistant, capable of withstanding the temperatures of the water used to brew coffee and/or to make the coffee filter support device 200 dishwasher safe. (In some embodiments, materials can withstand heat of 212° F. or greater.) The thickness of the sloping body 205 may vary, depending on the type of material used, to help ensure the sloping body 205 remains structurally sound over the course of repeated use while also ensuring the weight of the coffee filter support device 200 minimizes deformation of coffee filters 105 (at least for embodiments where the coffee filter support device 200 is likely to rest on the coffee filter 105, rather than the rim of the coffee filter basket 110.

Figure 3:
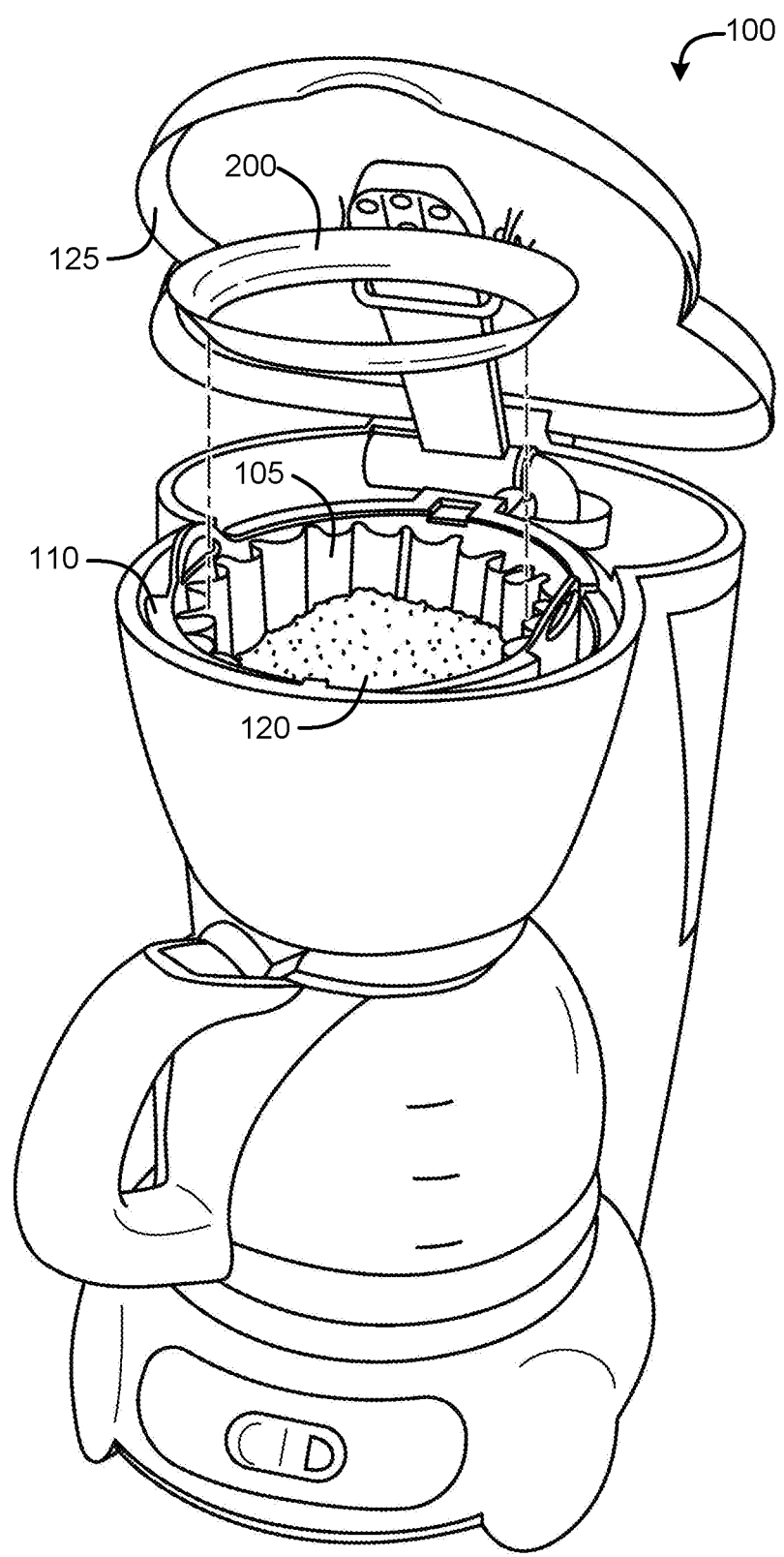
FIG. 3 is an illustration of how the coffee filter support device may be inserted into an example coffee brewing machine, according to an embodiment.

FIG. 3 is an illustration of how a coffee filter support device 200 may be used in a coffee brewing machine 100. Here, once the coffee filter 105 has been placed into the coffee filter basket 110, the coffee grounds 120 may be placed in the coffee filter 105, the coffee filter support device 200 may be placed at least partially in the coffee filter basket 110 as shown, the lid 125 may be shut, and the coffee brewing process may continue as normal. (Alternatively, the coffee filter support device 200 may be placed on the coffee filter 105 prior to placing the coffee grounds in the coffee filter 105, in which case the coffee grounds may be poured into the coffee filter 105 via the apertures of the coffee filter support device 200.)

Figure 4:
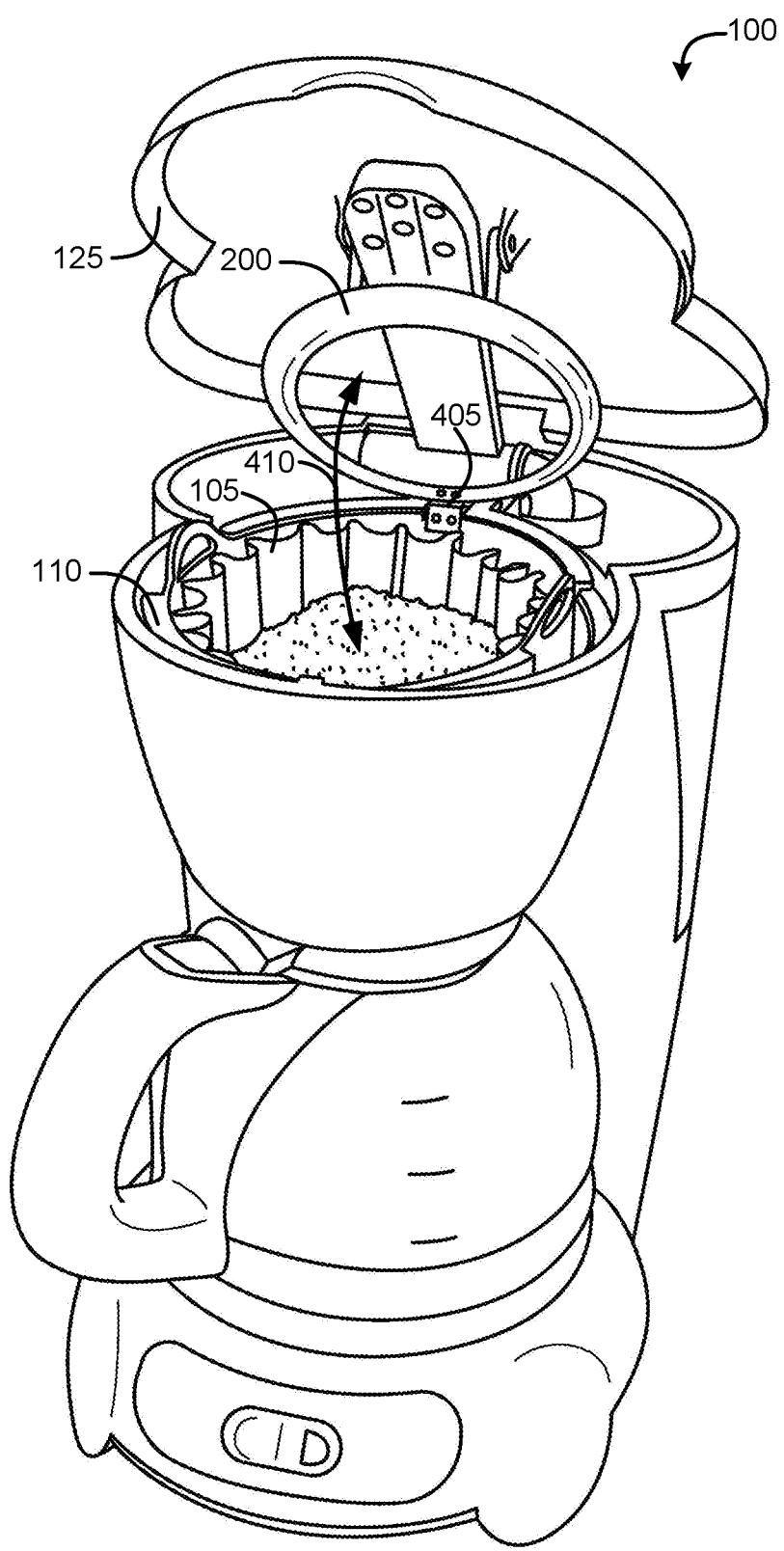
FIG. 4 is an illustration of how the coffee filter support device may be integrated with a coffee basket of an example coffee brewing machine, according to an embodiment.

FIG. 4 is an illustration of an alternative embodiment in which the coffee filter support device 200 is integrated with the coffee filter basket 110. Here, the coffee filter support device 200 is attached to the coffee filter basket 110 by a hinge 405, enabling the coffee filter support device 200 to rotate as indicated by arrow 410. The coffee filter support device 200 can then be rotated upward during the placement of the coffee filter 105 into the coffee filter basket 110, then rotated downward at least partially into the coffee filter basket 110. Although the coffee filter support device 200 may rest on the coffee filter 105, some embodiments may include one or more physical stops incorporated into the hinge 405 and/or sloping body of the coffee filter support device 200 (e.g., as tabs) configured to additionally or alternatively rest on the rim of the coffee filter basket 110 to help ensure the coffee filter support device 200 does not rotate downward into the coffee filter basket 110 but instead remains substantially parallel with the top of the coffee filter basket 110.

Alternative embodiments may incorporate additional or alternative features. For example, embodiments may utilize additional or alternative attachment means to attach the coffee filter support device 200 to the coffee filter basket 110 and/or another part of the coffee brewing machine 100. In some embodiments, for example, the coffee filter support device 200 may be permanently or detachably coupled to the lid 125 so as to be positions correctly with respect to the coffee filter 105 when the lid 125 is closed during the brewing process.

Figure 5:
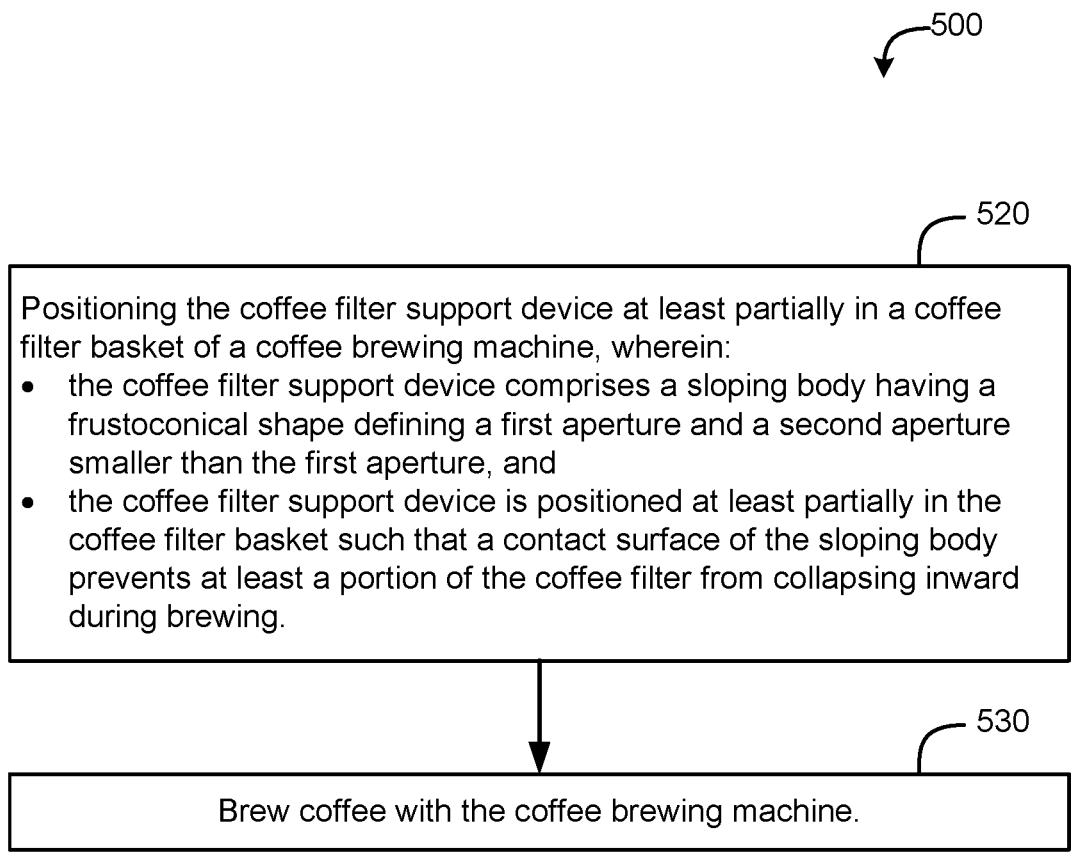
FIG. 5 is a flow chart outlining a method for placing the coffee filter support device into a coffee brewing machine.

FIG. 5 is a flow diagram illustrating a method 500 for using a coffee filter support device, according to an embodiment. Again, embodiments may vary, depending on the features an/or other aspects of the coffee brewing machine and/or coffee filter support device utilized. A person of ordinary skill in the art will appreciate such variations.

It can be noted that the functionality described in the blocks of FIG. 5 may occur after a coffee filter is placed in a coffee filter basket of a coffee brewing machine. Alternatively, block 520 (described in more detail below) may occur prior to the placement of the coffee filter in the coffee filter basket. This may depend on the functionality of the coffee brewing machine and/or preference of a user.

As previously indicated, the coffee filter may comprise a paper filter. However, the method 500 and other embodiments described herein may be utilized with other types of coffee filters including synthetic and/or other reusable filters that also may be susceptible to bending and/or collapsed during coffee brewing.

At block 520, a coffee filter support device is positioned at least partially in a coffee filter basket of a coffee brewing machine, wherein the coffee filter support device comprises a sloping body having a frustoconical shape defining a first aperture and a second aperture smaller than the first aperture, and the coffee filter support device is positioned at least partially in the coffee filter basket such that a contact surface of the sloping body prevents at least a portion of the coffee filter from collapsing inward during brewing.

The placement of the coffee filter support device at least partially in the coffee filter basket may vary, depending on desired functionality. As illustrated in FIG. 3, the coffee filter support device may comprise an element separate from the coffee brewing machine, which may be placed manually by a user. In other embodiments, such as the embodiment shown in FIG. 4, the coffee filter support device may be coupled with the coffee brewing machine (e.g., coupled to the coffee filter basket or lid) such that the coffee filter support device is properly positioned with respect to the coffee filter during brewing.

The precise position of the coffee filter support device with respect to the coffee filter may vary, depending on desired functionality. As previously indicated, in some embodiments, the coffee filter support device may be placed directly on the coffee filter such that the contact surface of the coffee filter support device rests on the coffee filter, which holds the coffee filter support device in place during brewing. In other embodiments, the coffee filter support device may rest on the rim of the coffee filter basket and/or be supported in place by other means such that the coffee filter support device is positioned slightly above the coffee filter. In such embodiments, the contact surface of the coffee filter support device may come in contact with the coffee filter if the coffee filter begins to collapse inward during brewing. In other embodiments, the coffee filter support device is positioned at least partly in the coffee basket such that it comes in contact with both the coffee filter and one or more components of the coffee brewing machine (e.g., the coffee filter basket, lid, etc.).

Finally, at block 530, the method comprises brewing coffee with the coffee brewing machine. After brewing, the coffee filter support device may be removed from at least partially within the coffee filter basket and subsequently reused, while the coffee grounds and coffee filter may be thrown away.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

Aspects of the present disclosure may be embodied in other forms without departing from its spirit or essential characteristics. The described aspects are to be considered in all respects illustrative and not restrictive. The claimed subject matter is indicated by the appended claims rather than by the forgoing description. All changes which come within the meaning and range of equivalency of the claims are to be embraced within their scope.

What is claimed is:

1. A method of using a coffee filter support device, the method comprising:
    positioning the coffee filter support device at least partially in a coffee filter basket of a coffee brewing machine, wherein:
        the coffee filter support device comprises a sloping body having a frustoconical shape comprising a contact surface and defining a first circular aperture and a second circular aperture smaller than the first circular aperture, and
        an angle between a contact portion of a contact surface of the sloping body and a surface parallel to the first circular aperture is less than 70°; and
    the coffee filter support device is positioned at least partially in the coffee filter basket such that contact between the contact portion of the contact surface of the sloping body and a coffee filter, a rim of the coffee filter basket, or both, holds the coffee filter support device in place, wherein the contact portion of the contact surface further prevents at least a portion of the coffee filter from collapsing inward during brewing; and
    brewing coffee with the coffee brewing machine.

2. The method of claim 1, wherein the coffee filter support device comprises a heat-resistant plastic.

3. The method of claim 1, wherein a diameter of the first circular aperture is greater than 4 inches, and a diameter of the second circular aperture is less than 4 inches.

4. The method of claim 3, wherein the diameter of the first circular aperture is 4¼ inches.

5. The method of claim 3, wherein the diameter of the second circular aperture is 3⅜ inches.

6. The method of claim 1, wherein a diameter of the first circular aperture is less than a diameter of the coffee filter basket.

7. The method of claim 1, wherein a height of the sloping body, defining a distance between the first circular aperture and the second circular aperture, is between ½ inch and 1 inch.

8. The method of claim 7, wherein the height of the sloping body is ¾ inch.

9. The method of claim 1, wherein the angle between the sloping body and a surface parallel to the first circular aperture is between 50° and 70°.

10. The method of claim 9, wherein the angle between the sloping body and the surface parallel to the first circular aperture is 60°.

11. A coffee filter support device, comprising:
    a sloping body comprising a food-grade, heat-resistant plastic having a frustoconical shape comprising a contact surface and defining a first circular aperture and a second circular aperture smaller than the first circular aperture; wherein:
        a contact portion of the contact surface is configured to, when placed at least partially in a coffee filter basket of a coffee brewing machine:
            contact a coffee filter, a rim of the coffee filter basket, or both:
            hold the coffee filter support device in place, and prevent at least a portion of the coffee filter from collapsing inward during brewing;

a diameter of the first circular aperture is greater than 4 inches and less than 4½ inches;

a diameter of the second circular aperture is less than 4 inches and greater than 3 inches; and an angle between the contact portion of a contact surface of the sloping body and a surface parallel to the first circular aperture is between 50° and 70°.

12. The coffee filter support device of claim 11, wherein the diameter of the first circular aperture is 4¼ inches.

13. The coffee filter support device of claim 11, wherein the diameter of the second circular aperture is 3⅜ inches.

14. The coffee filter support device of claim 11, wherein a height of the sloping body, defining a distance between the first circular aperture and the second circular aperture, is between ½ inch and 1 inch.

15. The coffee filter support device of claim 14, wherein the height of the sloping body is ¾ inch.

16. The coffee filter support device of claim 11, wherein the angle between the sloping body and the surface parallel to the first circular aperture is 60°.

17. A coffee brewing machine, comprising:
a coffee filter basket; and
a coffee filter support device;

wherein:
the coffee filter support device comprises a sloping body having a frustoconical shape comprising a contact surface and defining a first circular aperture and a second circular aperture smaller than the first circular aperture; and the coffee filter support device is permanently or detachably coupled to the coffee brewing machine such that the coffee filter support device is positioned at least partially in the coffee filter basket while the coffee brewing machine is brewing, such that contact between a contact portion of the contact surface of the sloping body and a coffee filter, a rim of the coffee filter basket, or both, holds the coffee filter support device in place, wherein the contact portion of the contact surface further prevents at least a portion of the coffee filter placed within the coffee filter basket from collapsing inward during brewing.

18. The coffee brewing machine of claim 17, wherein the coffee filter support device is attached to the coffee filter basket with a hinge.

* * * * *